United States Patent
Bonner et al.

(10) Patent No.: US 9,519,649 B2
(45) Date of Patent: Dec. 13, 2016

(54) FREE SPACE MANAGEMENT IN A DATABASE

(71) Applicant: International Business Machines Corporation, Armonk, NY (US)

(72) Inventors: Charles R. Bonner, San Jose, CA (US); John J. Campbell, Privett (GB); Frances H. Villafuerte, San Jose, CA (US); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 14/047,992

(22) Filed: Oct. 7, 2013

(65) Prior Publication Data

US 2015/0100606 A1  Apr. 9, 2015

(51) Int. Cl.
G06F 17/30 (2006.01)
(52) U.S. Cl.
CPC ... G06F 17/30138 (2013.01); G06F 17/30345 (2013.01)
(58) Field of Classification Search
CPC .............. G06F 17/30345; G06F 17/30138
See application file for complete search history.

(56) References Cited

U.S. PATENT DOCUMENTS

| | | | |
|---|---|---|---|
| 6,687,719 B1 | 2/2004 | Quernemoen | |
| 7,693,875 B2 | 4/2010 | Hrle | |
| 7,720,876 B2 | 5/2010 | Maxfield | |
| 7,765,211 B2 | 7/2010 | Bhattacharjee | |
| 7,886,124 B2 | 2/2011 | Muthulingam | |
| 8,306,978 B2 | 11/2012 | Bower | |
| 2004/0034643 A1* | 2/2004 | Bonner | G06F 17/30339 |
| 2006/0117029 A1 | 6/2006 | Yingst | |
| 2007/0203958 A1* | 8/2007 | Suzuki | G06F 11/2048 |
| 2011/0125745 A1 | 5/2011 | Bright | |
| 2012/0096040 A1 | 4/2012 | Schreter | |
| 2012/0185667 A1 | 7/2012 | Gandhi | |

OTHER PUBLICATIONS

Cyran, Oracle Database Concepts 10g Release 2 (10.2), B14220-02, Oct. 2005, p. 2-1-p. 2-16.*
Mullins, DB2 Developer's Guide: A Solutions-Oriented Approach to Learning the Foundation and Capabilities of DB2 for z/OS, Sixth Edition, Apr. 27, 2012, pp. 1265-1277.*
Oracle table fragmentation, Jun. 15, 2010, pp. 1-6.*
PCTUSED and PCTFREE usage, Oct. 1, 2010, pp. 1-3.*
IP.COM et al.; "Method For Increasing Concurrency Of Index Space Mapping Pages In A Shared Disk Database", IPCOM000209827D, Aug. 17, 2011, pp. 1-3.
Ailamaki et al.; "Data Page Layouts For Relational Databases On Deep Memory Hierarchies", The VLDB Journal (2002), vol. 11, Issue 3, Nov. 2002, pp. 198-215.

* cited by examiner

*Primary Examiner* — Albert Phillips, III
(74) *Attorney, Agent, or Firm* — Anthony V. S. England; Mohammed Kashef (57) ABSTRACT

A row is inserted in a database table on a page having a first space reserved for inserting rows of the database table. A second space is reserved for adding data to the inserted row, wherein reserving the second space includes reserving the second space on the page responsive to inserting the row.

12 Claims, 10 Drawing Sheets

FREE SPACE MANAGEMENT IN A DATABASE

BACKGROUND

Databases have data structures such as rows, pages, blocks, tables, and others, which may sometimes be referred to herein as "objects."

SUMMARY

According to an embodiment of the invention, a method for allocating space in a database includes inserting, by a computer processor, a row in a database table on a page having a first space reserved for inserting rows of the database table; and reserving, by a computer processor, a second space for adding data to the inserted row, wherein reserving the second space includes reserving the second space on the page responsive to inserting the row.

Other aspects and embodiments of the invention are disclosed and claimed, including implementations in a computer system and a program product.

BRIEF DESCRIPTION OF DRAWINGS

Novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

DETAILED DESCRIPTION

Figure 1:
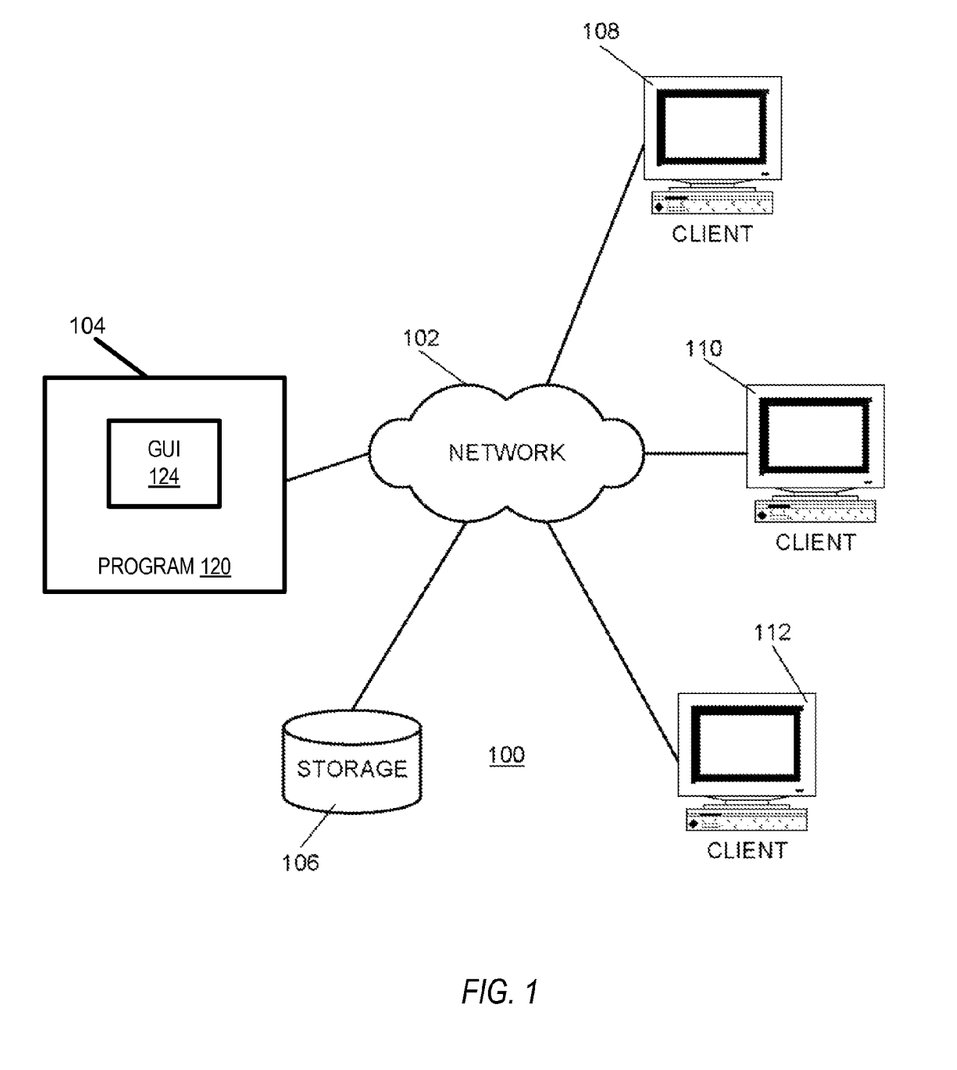
FIG. 1 is an exemplary block diagram illustrating a distributed data processing system according to embodiments of the invention.
Figure 2:
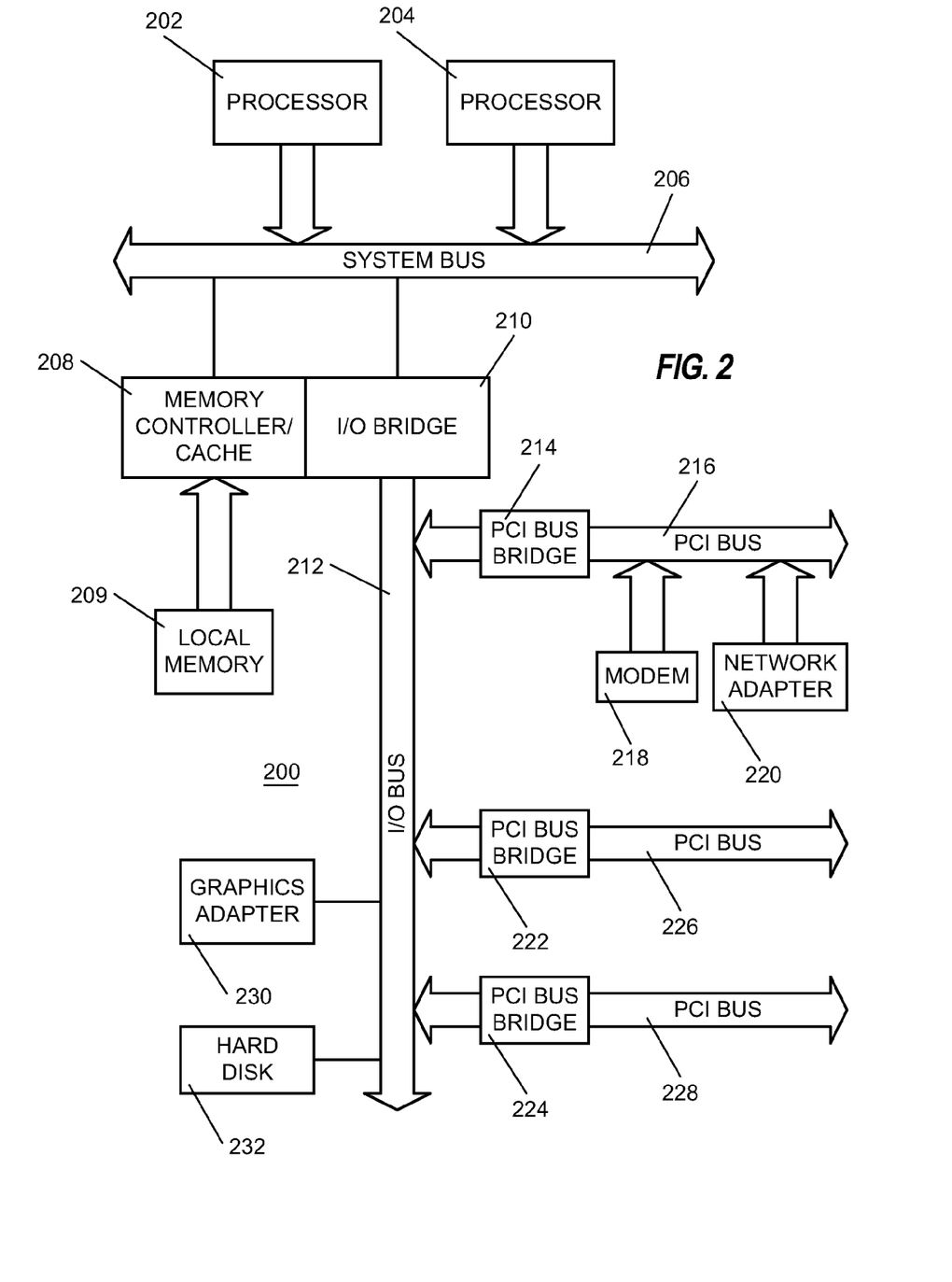
FIG. 2 is an exemplary block diagram of a server apparatus according to embodiments of the invention.
Figure 3:
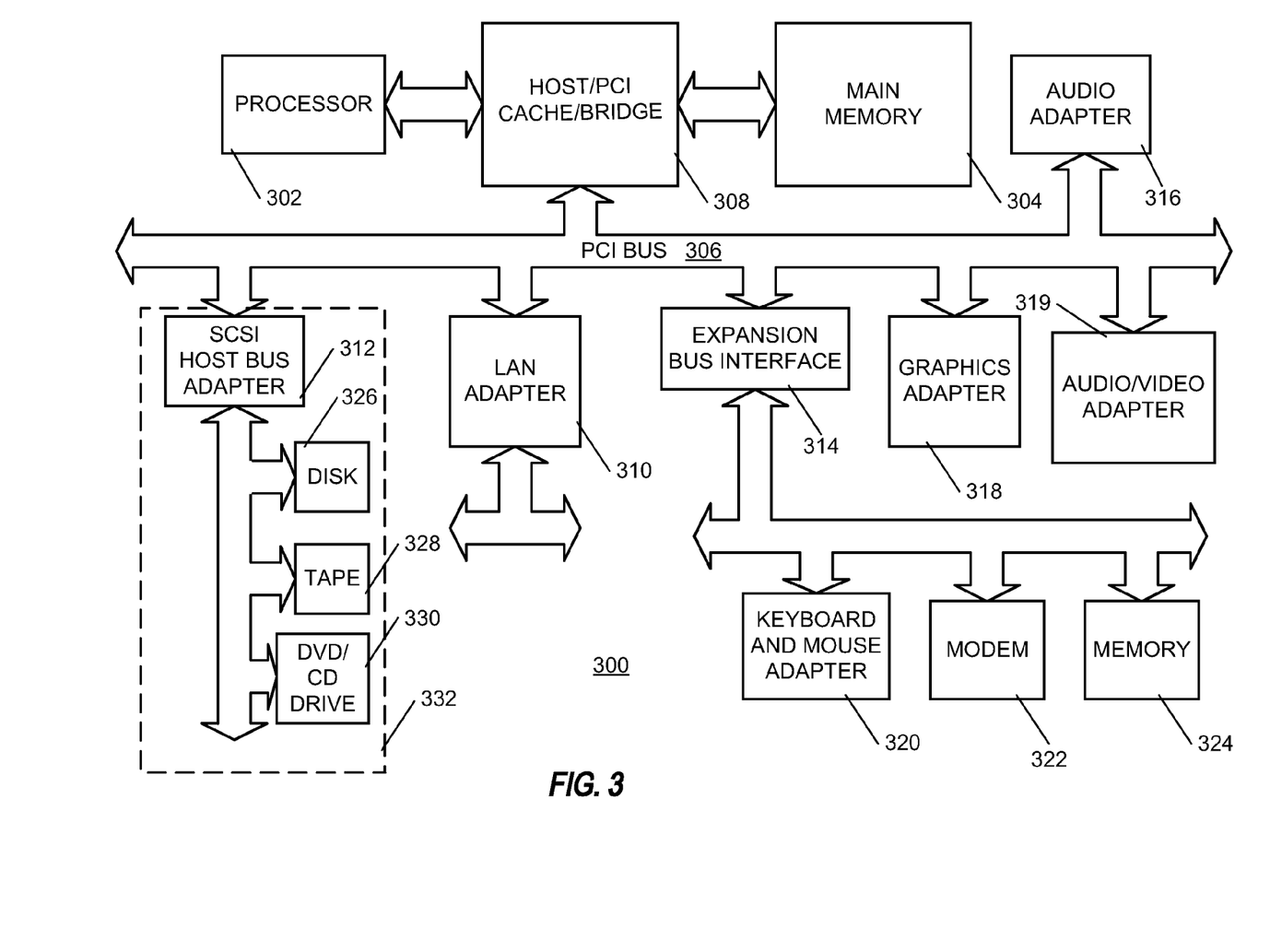
FIG. 3 is an exemplary block diagram of a client apparatus according to embodiments of the invention.

As previously noted, FIGS. 1-3 are, respectively, an exemplary block diagram illustrating a distributed data processing system, an exemplary block diagram of a server apparatus, and an exemplary block diagram of a client apparatus, all according to embodiments of the invention. Details of FIGS. 1 through 3 will be described after other Figures are described in detail.

Figure 4A:
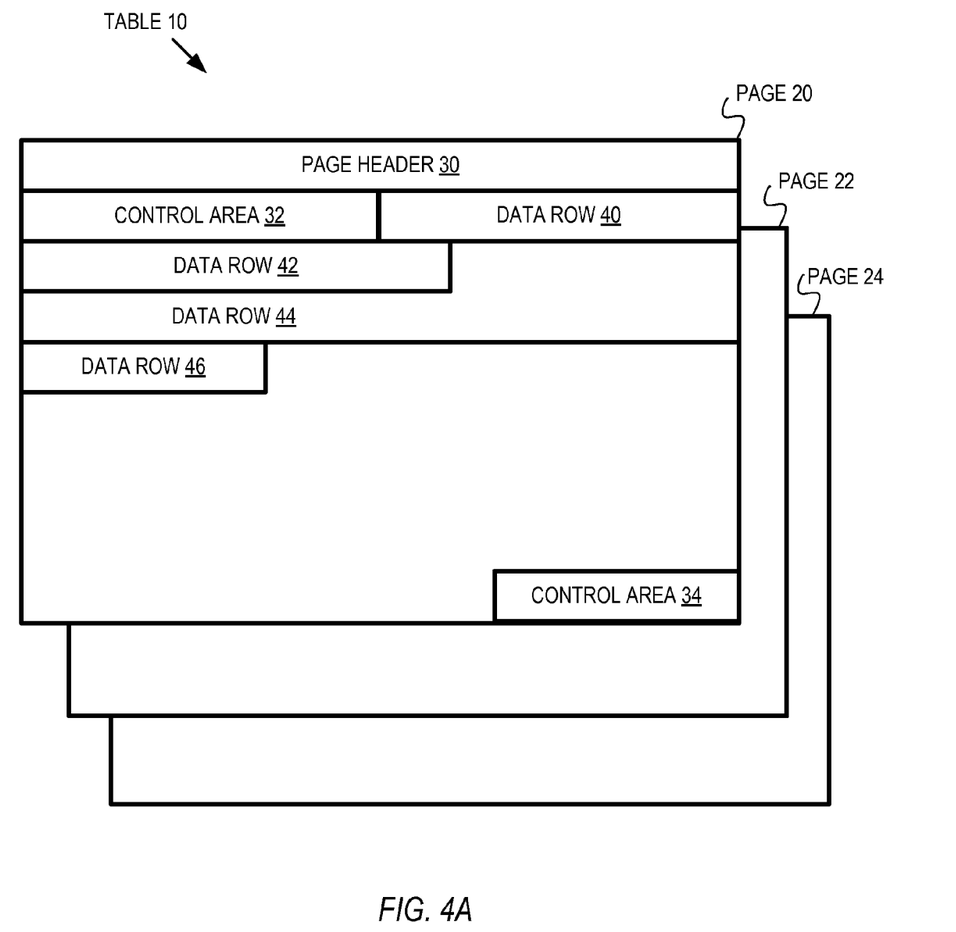
FIG. 4A illustrates structure of a database table, according to embodiments of the present invention.

A database may have a table 10, as shown in FIG. 4A, for example, including respective rows 40, 42, 44, 46 on one or more pages 20, 22, and 24. Rows 40, 42, 44, 46 may have schema that allow for variable row length. Row length may vary either because variable length columns are permitted or because data is compressed, among other reasons. The pages may be of user-defined size, such as 4 k, 8 k ... 32 k, etc.

A database layout may change due to operations on the data. For example, when permissions allow variable row length to arise, an UPDATE operation that a database system performs on a data object like table 10 may increase the size of a row. This may happen for a row 46 that is stored on a page 20, for example, when an UPDATE operation adds a comment to the row 46, thereby increasing the row's length. In another example, an UPDATE may set a value for a row such as row 46 that increases the length. Increasing the size of row 46 may require storing it on a different page than the page 20 on which it was originally stored.

Figure 4B:
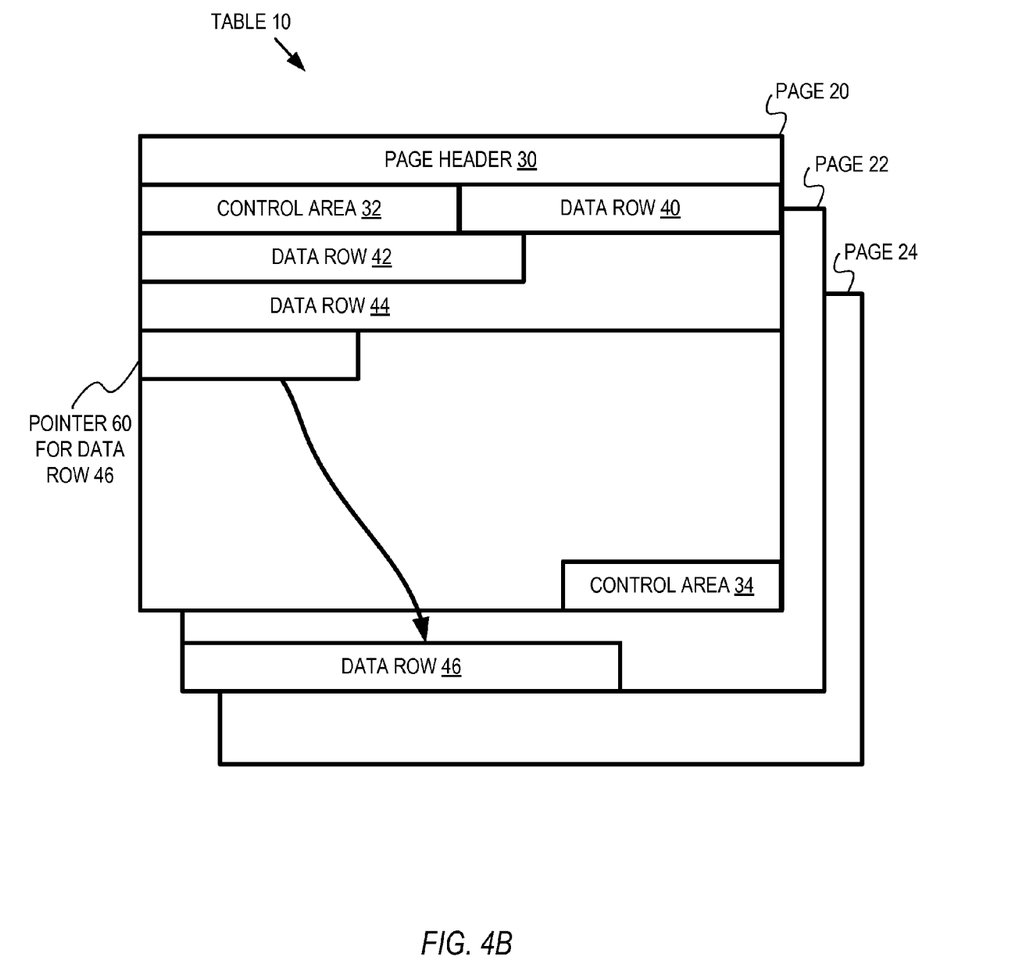
FIG. 4B illustrates structure of a database table with overflow pointer, according to embodiments of the present invention.

Moving a row affects data clustering. That is, storing row 46 on a new page 22, as shown in FIG. 4B, requires the database system to create an overflow pointer 60, stored in the place of the original row 46 (FIG. 4A) on the original page 20. Once the row 46 is stored in a new location, i.e., page 22 in the illustrated instance, the rows 40-46 for table 10 are no longer arranged in memory in the original, close physical proximity to one another. That is, the data are not clustered together as tightly.

Database processing may be affected by layout changes. The above examples illustrate that page and row layout changes may result from permissive free space management of row length. Embodiments of the present invention involve recognition that in a database system, this may affect performance on certain operations on database objects, such as due to page creation, row relocation and corresponding pointer creation. Speed of performing UPDATE and INSERT operations may be impacted, for example. Performance may be impacted due to searches for free space on additional pages and due to accessing data via pointers, for example. Similarly, changes in data clustering may reduce effectiveness of data prefetching. Less effective prefetching may, in turn, slow down processing performance for database SELECT operations, for example. And layout changes increase the number of locks needed and data sharing overhead related to locks. Changes in data clustering may also give rise to a need for REORG operations to get data cluster ratios within a predetermined range.

Figure 5:
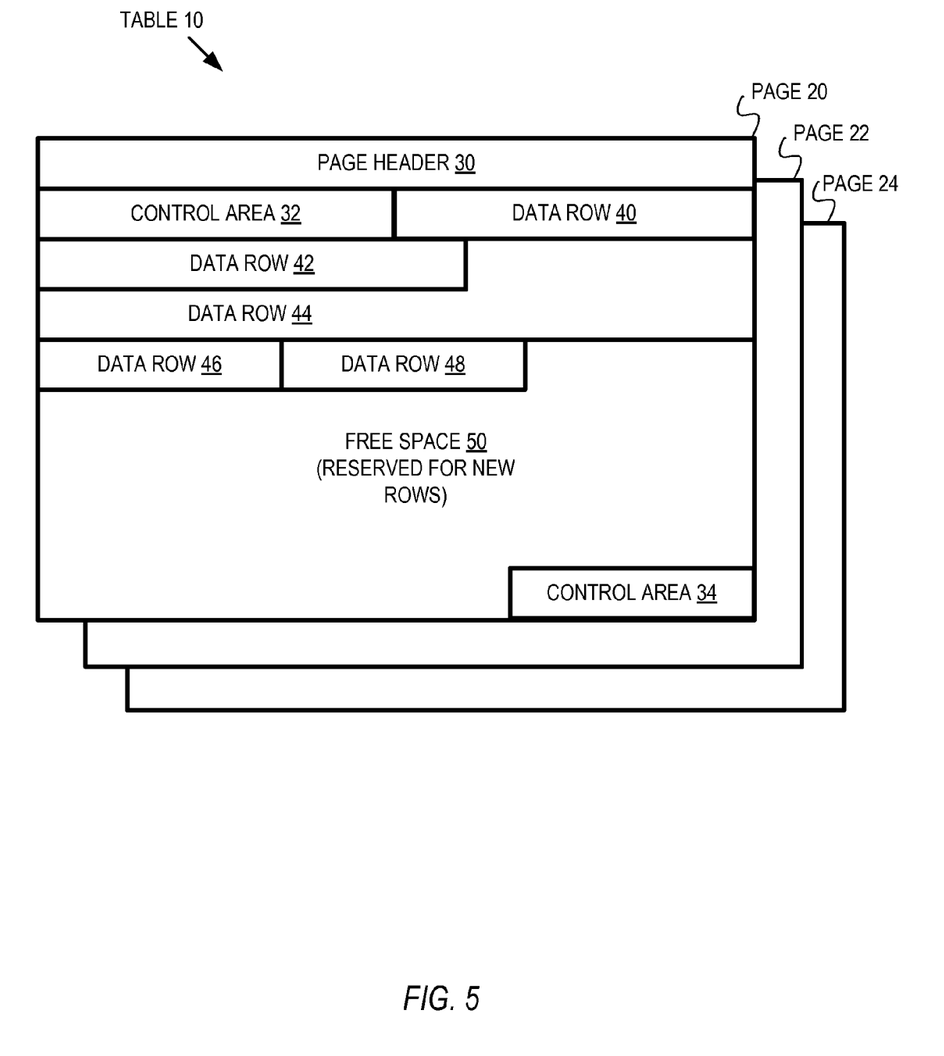
FIG. 5 illustrates structure of a database table with space reserved for inserting new rows, according to embodiments of the present invention.

A database system may reserve free space 50, as shown in FIG. 5, for rows added by INSERT operations, where the amount of space 50 to reserve is defined in schema creation of a CREATE TABLESPACE operation for a table 10 on pages 20, 22 and 24, for example. This may include reserving free space on original page 20 for creating additional rows of the table 10 and also reserving one or more free pages, such as pages 24 and 26, for example, in memory adjacent to original page 20 for creating additional rows of the table. Thus, when a new row 48 is added by an INSERT operation, it may go on the original page 20, if the row 48 fits within reserved space 50.

Figure 6A:
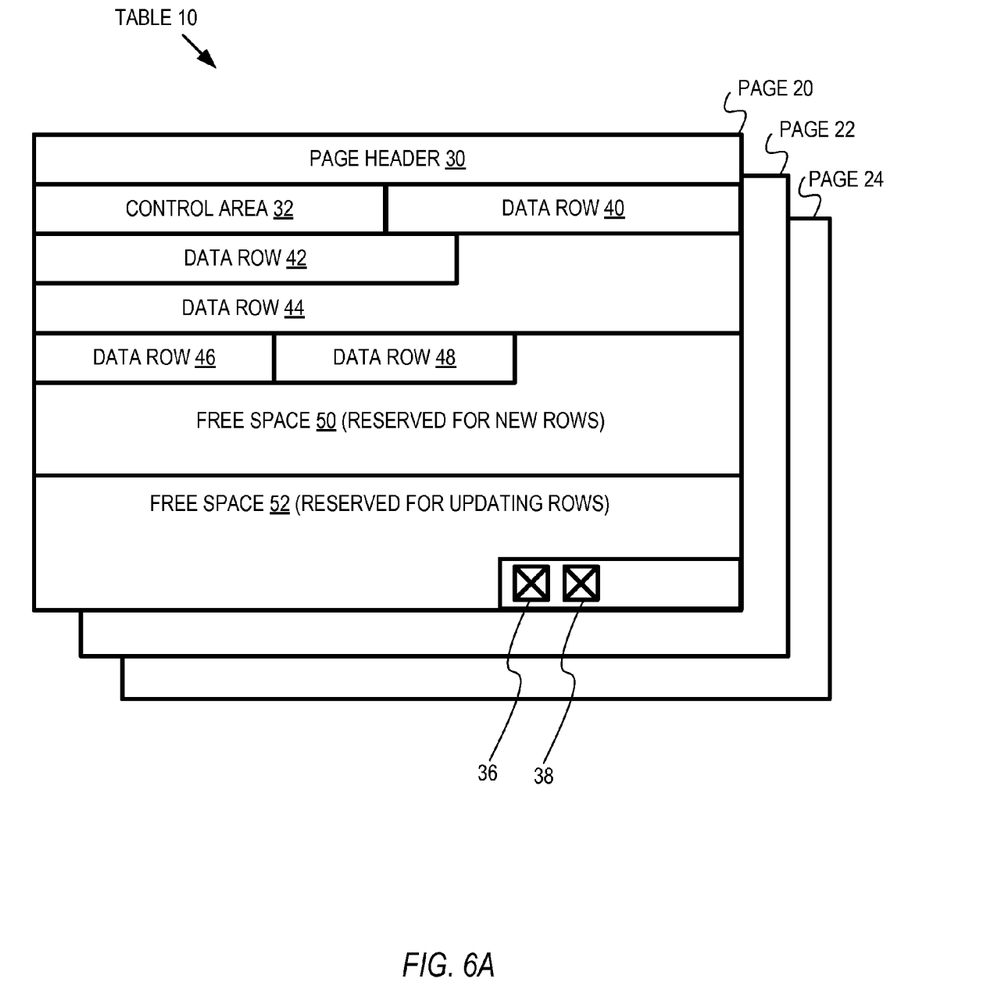
FIG. 6A illustrates structure of a database table with space for inserting new rows and space for updating rows, according to embodiments of the present invention.

Space is reserved for increasing the length of rows via UPDATE operations, according to embodiments of the present invention. For example, in schema creation of a CREATE TABLESPACE operation for a table 10 on a page 20 a database system enables reservation of free space 52 on original page 20 for UPDATE operations to increase the size of rows, such as rows 40-48 as shown in FIG. 6A. This may be done, for example, by a statement such as:
CREATE TABLESPACE . . . PCTFREE <X integer> FOR UPDATE <Y integer>
where the X integer relates to reserving space 50 for adding rows of table 10 via INSERT operations and the Y integer defines, how much space 52 will be reserved on page 20 for a row, i.e., for increasing the length of the row of table 10 via UPDATE operations, when the row is added to page 20 by an INSERT operation. In alternative embodiments, database system may reserve free space 52 on one or more pages other than original page 22 for UPDATE operations to increase the size of rows, such as page 22 or 24 shown in the illustrated instance, for example. In other words, each time a row is inserted, a little bit more space Y is added to space 52 to use for row UPDATES. That is, the amount of space 52 grows with each inserted row.

Pages may be marked full before they actually are full, according to embodiments of the present invention as illustrated in FIG. 6A. The database system may do this when reserving space for UPDATEs to rows and may also independently do this when reserving space for INSERTs, which insert rows. That is, a database system reserves space 50 on a table's page 20 for inserting rows, as described above. The database system also reserves additional space 52 on page 20 for updating rows (i.e., increasing row length), e.g., rows 40-46, as described above. Once the database system detects that all reserved space 50 for inserted rows has been used, the database system marks page 20 full for the purpose of INSERTs, such as by setting a flag 36, whereupon the database system will thereafter insert new rows on one or more new pages and will thereafter not insert more rows on the page 20, even though additional space may still exist on page 20 that is reserved for updating the rows on page 20 and even though the database system will increase row length responsive to UPDATEs using remaining space 52 on page 20 reserved for UPDATEs, as long as enough of space 52 remains unused. Likewise, once the database system detects that all reserved space 52 for updated rows has been used, the database system marks page 20 full for the purpose of UPDATEs, such as by setting a flag 38, whereupon the database system will thereafter increase row length for rows on page 20 by moving rows to one or more new pages and adding pointers to the original page 20 of the rows and will thereafter no longer use space 52 on the same page 20 to increase the length of more rows, even though additional space 50 may still exist on the page 20 that is reserved for inserting the rows on page 20 and even though the database system will still insert rows responsive to INSERTs using remaining space 50 on the page 20 reserved for INSERTs, as long as enough of space 50 remains unused.

In other embodiments of the present invention, once the database system detects that there is insufficient reserved space 50 for inserting a row, then if there is sufficient room in space 52 for the new row, which is ordinarily used for row updates, the database system may use space 52 for the purpose of inserting the row. Likewise, once the database system detects that there is insufficient reserved space 52 for an update to a row, then if there is sufficient room in space 50 for updating the row, which is ordinarily used for inserting rows, the database system may use space 50 for the purpose of updating the row.

Figure 6B:
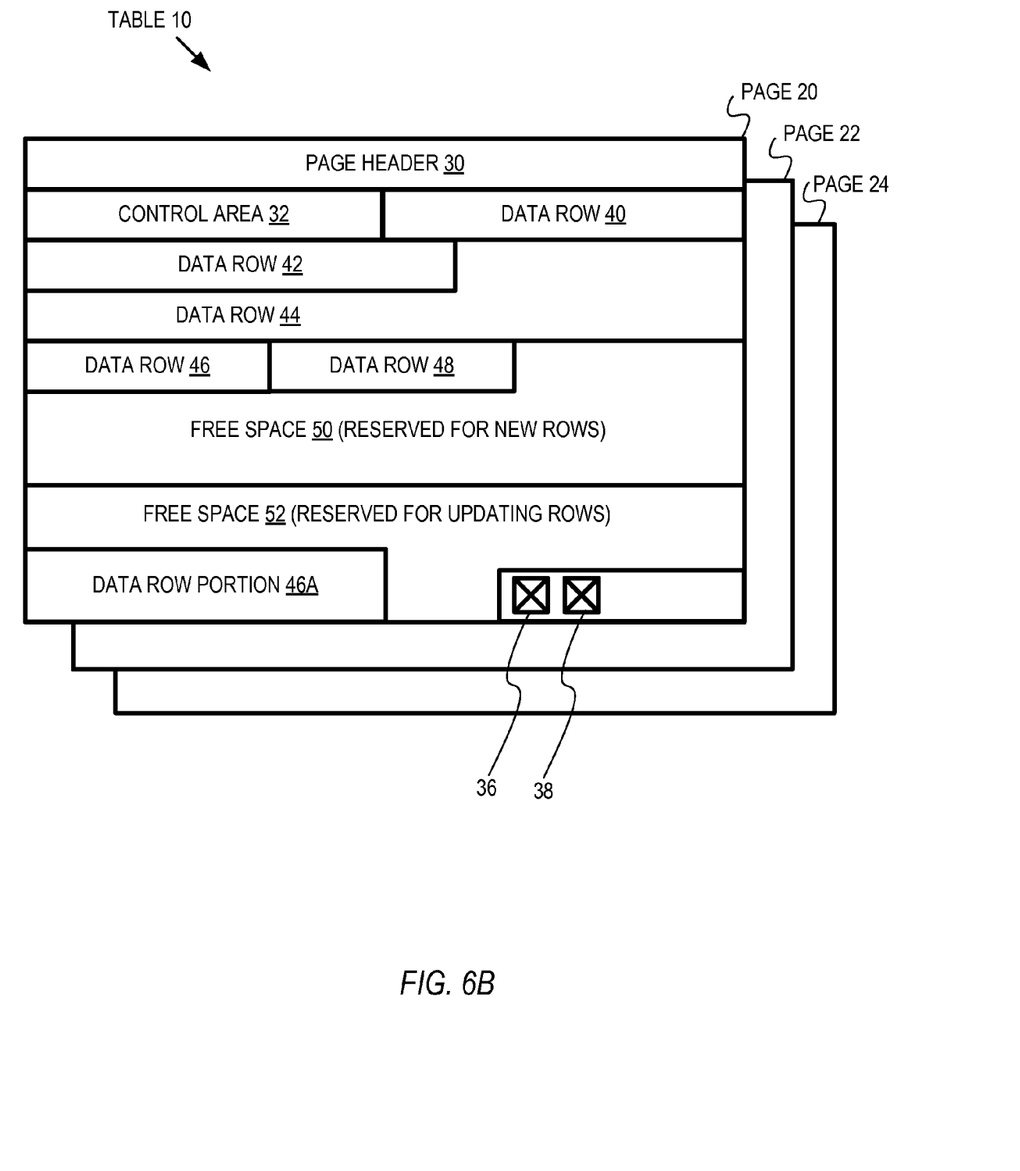
FIG. 6B illustrates structure of the database table of FIG. 6A with an updated row, according to embodiments of the present invention.

Issues may still arise if space is reserved merely on a static basis. As explained above, schema that allow variable row length may give rise to performance effects due to physical layout changes relating to free space issues. Embodiments of the present invention also include recognition that even though an option is provided during schema creation to specify free space set aside for adding rows or changing row length, this may be insufficient if the option only provides for defining a static amount of free space, since free space needed for any given table on any given page is dependent on dynamic characteristics, i.e., characteristics that change during database system operation, such as workload characteristics, for example. Given a page, such as page 20 of FIG. 6A, that has 20% of the page, for example, reserved as space 52 for UPDATEs to rows, as disclosed herein above, a row such as row 46 (FIG. 6A) may be expanded to include a portion 46A within reserved space 52 on the same page 20 when an UPDATE comes later on, provided that the additional portion 46A of row 46 fits within the 20% reserved space 52, as shown in FIG. 6B. Even if schema creation defines a static 20% value for reserving such empty space on a page for UPDATE operations, however, it may happen that when an UPDATE operation adds an especially long comment to a row, that row may require 50% free space to accommodate the row on the same page. On the other hand, row length may not change at all in another UPDATE instance, in which case it is a waste to have even 20% free space reserved on the page.

Figure 7:
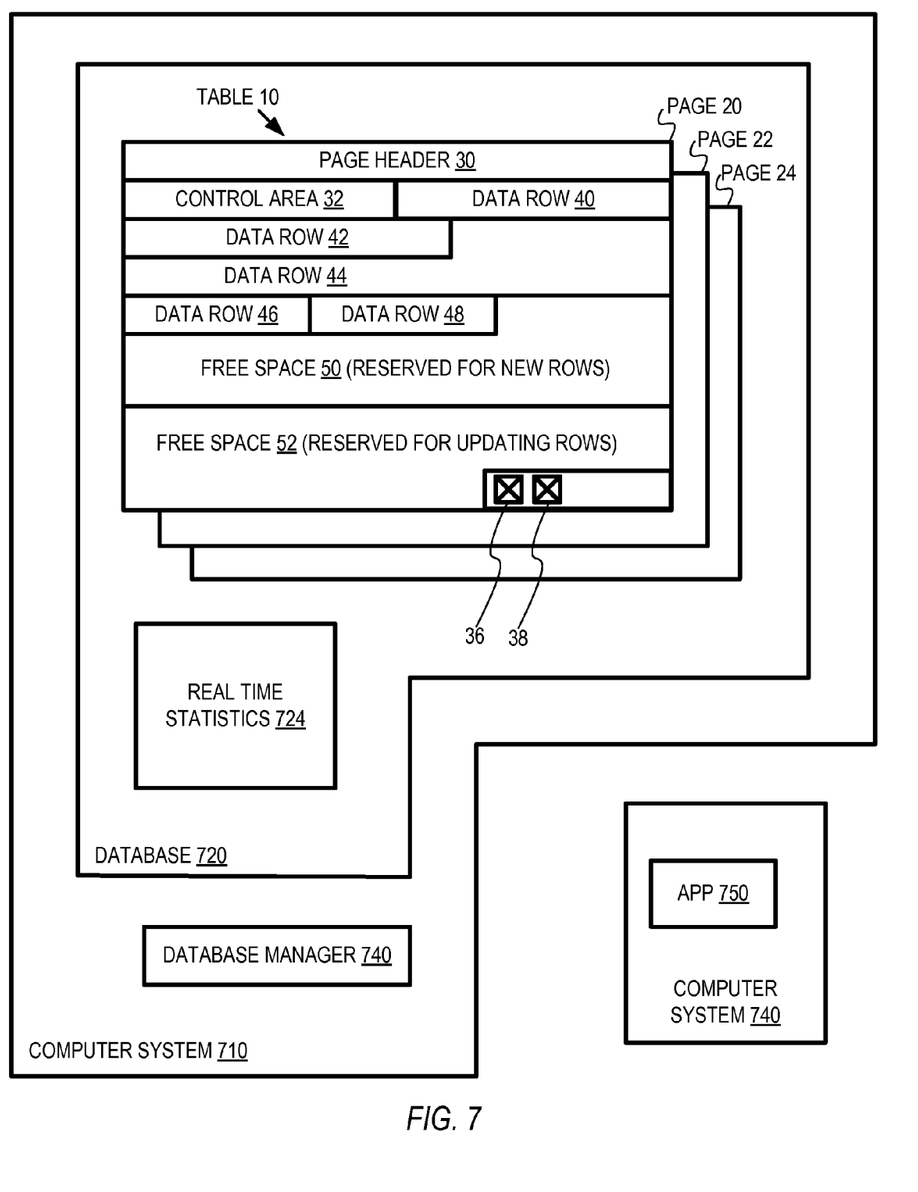
FIG. 7 illustrates structure of a database table with database manager processing database application requests and gathering real time statistics, according to embodiments of the present invention.

A table 10 of a database 720 is illustrated in a particular context in FIG. 7, according to one or more embodiments of the present invention. A database manager 740, i.e., an executing computer program, handles requests from a database application 750 to store or retrieve data of database 720, as well as processing the database application's requests to commit or abort changes. Typically, manager 740 runs on a computer system 710 serving a number of users and the requests originate from a user via an application 750 running on a computer system 740 of the user's, as shown. However, manager 720 may also run on user's computer system 740. Database 720 may reside on computer system 710 that hosts database manager 720 or may reside elsewhere, including on user's computer system 740. Computer systems such as 710 and 740 may be distributed, of course, e.g., cloud-based.

Database manager 740 gathers real time statistics ("RTS") 724 for reserving space on a dynamic basis, according to embodiments of the present invention, since static definition of free space may not address all the needed characteristics to manage processing performance of database 720, as the above examples illustrate.

In embodiments, database manager 740 may automatically allocate free space to reserve for UPDATE operations responsive to collected dynamic workload characteristic history for UPDATE operations occurring between REORG operations. For example, if so specified by the above described schema creation command for a table, database manager 740 logs history 724 of workload characteristics for UPDATE operations relating to space consumption on objects, such as rows, for example. Then, when database manager 740 performs an INSERT operation to create a row in the table, database manager 740 calculates an amount of free space to reserve for the newly created row, i.e., free space that may be used by future UPDATE operations on the row, where the calculation bases the amount on the collected UPDATE history 724, which can vary among data pages.

Still more specifically, history logging includes logging the following statistics, according to embodiments of the present invention. Database manager 740 increments respective counters for respective types of objects. Taking rows, such as rows 40-48 of table 10, for example, database manager 740 increments a counter REORGINSERTS of RTS 724 each time an INSERT statement is executed to create a row and increments a counter of RTS 724 each time a DELETE statement is executed to delete a row and saves the counts. Database manager 740 also increments a counter REORGUPDATES to record the number of times an UPDATE statement is executed for a row. Database manager 740 accumulates in a variable UPDATESIZE of RTS 724 the cumulative amount of space, such as measured in bytes, by which the rows were increased or decreased due to the times when an UPDATE statement is executed for the rows and also increments a counter of RTS 724 for the UPDATE operations each time such an increase causes a row to overflow to a new page. In embodiments, database manager 740 may reset the above described counters and variables responsive to REORG operations, so that these statistics 724 indicate accumulated workload characteristics since the most recent REORG.

A REORG operation may be a REORG TABLESPACE operation of a DB2 database manager 740, in embodiments of the present invention, which may, in some embodiments, be executed in connection with a LOAD TABLE operation. Such a REORG TABLESPACE operation reorganizes a table space to improve access performance and to reclaim fragmented space, where a table space is a storage area where one or more tables are stored. A table space may be divided into units referred to herein as pages. Although a table space may be described as "partitioned" or "segmented," the term "page" as used herein is intended to also encompass meanings such as a "partition" and a "segment." A REORG TABLESPACE operation may reorganize a specified range of one or more pages of a table space, rather than the whole table space. The REORG TABLESPACE operation helps increase effectiveness of prefetch operations by removing imbedded free space and making pages contiguous, at least to some extent.

According to embodiments of the present invention, space is reserved for updates on a dynamic basis using the above described history of real time operating statistics 724. The command CREATE TABLESPACE . . . PCTFREE <X integer> FOR UPDATE <Y integer> may direct database manager 740 to do so for a table, such as illustrated table 10, when a predetermined value for <Y integer> is specified in the received command creating the table. This dynamic space reservation process includes calculating, when an INSERT operation creates a row, such as illustrated row 40, 42, etc., an amount of free space 52 to reserve for UPDATE operations to increase the length of the row includes calculating based on the real time statistics 724.

For example, when database manager 740 creates a row schema for a new row, such as row 48, for example, responsive to receiving an INSERT request, database manager 740 automatically computes the average amount of space added for previously executed UPDATE operations for already existing rows, e.g., rows 40, 42 and 46, of the same table 10 since the time of the last REORG operation for table 10. This is computed by dividing the total amount of space 52 added due to previous UPDATE row operations for table 10, as indicated in variable UPDATESIZE of RTS 724, by the number of such previous operations, as indicated by the count of UPDATE operations in count REORGUPDATES of RTS 724. Then, for the required row schema free space allocation, database manager 740 automatically adds to reserved space 52 in the computed average amount.

A ratio of UPDATEs to INSERTs determines whether database manager 740 may begin reserving space on a dynamic basis for UPDATES to rows of a table, according to embodiments of the present invention. That is, a received command may direct database manager 740 to reserve space on a dynamic basis for UPDATES to rows of a table, as stated herein above. But database manager 740 does not begin reserving the space on a dynamic basis until the ratio UPDATEs to INSERTs for the table since the last REORG exceeds a certain predetermined minimum.

Specifically, for each table, such as table 10, database manager 740 increments a counter REORGINSERTS each time an INSERT operation occurs and resets the counter each time a REORG occurs, thereby providing a count of the number of rows inserted for table 10 since the last REORG. Likewise, for each such table 10, database manager 740 increments a counter REORGUPDATES each time an UPDATE operation occurs and resets the counter each time a REORG occurs, thereby providing a count of the number of rows updated for table 10 since the last REORG. Once the ratio of REORGUPDATES to REORGINSERTS exceeds a predetermined minimum, database manager 740 begins reserving space for UPDATES on a dynamic basis, i.e., using history of real time statistics, as described herein above. In embodiments of the present invention, the above described calculations may be done in memory and saved externally at regular time intervals, which is in order to reduce overhead.

Database manager 740 may allocate free space for UPDATES based on a predetermined value prior to allocating free space dynamically responsive to collected RTS 724. That is, before a sufficient amount of such history is available and before the ratio of UPDATEs to INSERTs exceeds a predetermined threshold, database manager 740 may allocate free space for UPDATES on a static basis. The static value may be specified in the CREATE TABLESPACE, in embodiments of the present invention. This static value may specify to reserve no space at all for UPDATEs or some other amount of space until RTS 724 history and REORGUPDATES/REORGINSERTS are sufficient.

From the foregoing, it should be appreciated that by database manager 740 avoiding a trip to another page when accessing a row with an overflow to another page, this improves CPU and I/O performance that underlie database processing performance. It likewise improves performance by reducing searches for free space when database manager 740 performs an insert operation that inserts data in a row and the data won't fit in the current row length beyond the free space that is already set aside or when database manager 740 performs an UPDATE operation explicitly for increasing row length and, once again, the operation increases the length beyond the free space that is already set aside. It also reduces a need for REORG operations to get data cluster ratios back within a predetermined range and it reduces the number of locks needed and data sharing overhead related to locks. SELECT operations also benefit from improved physical layout of data.

Figure 8:
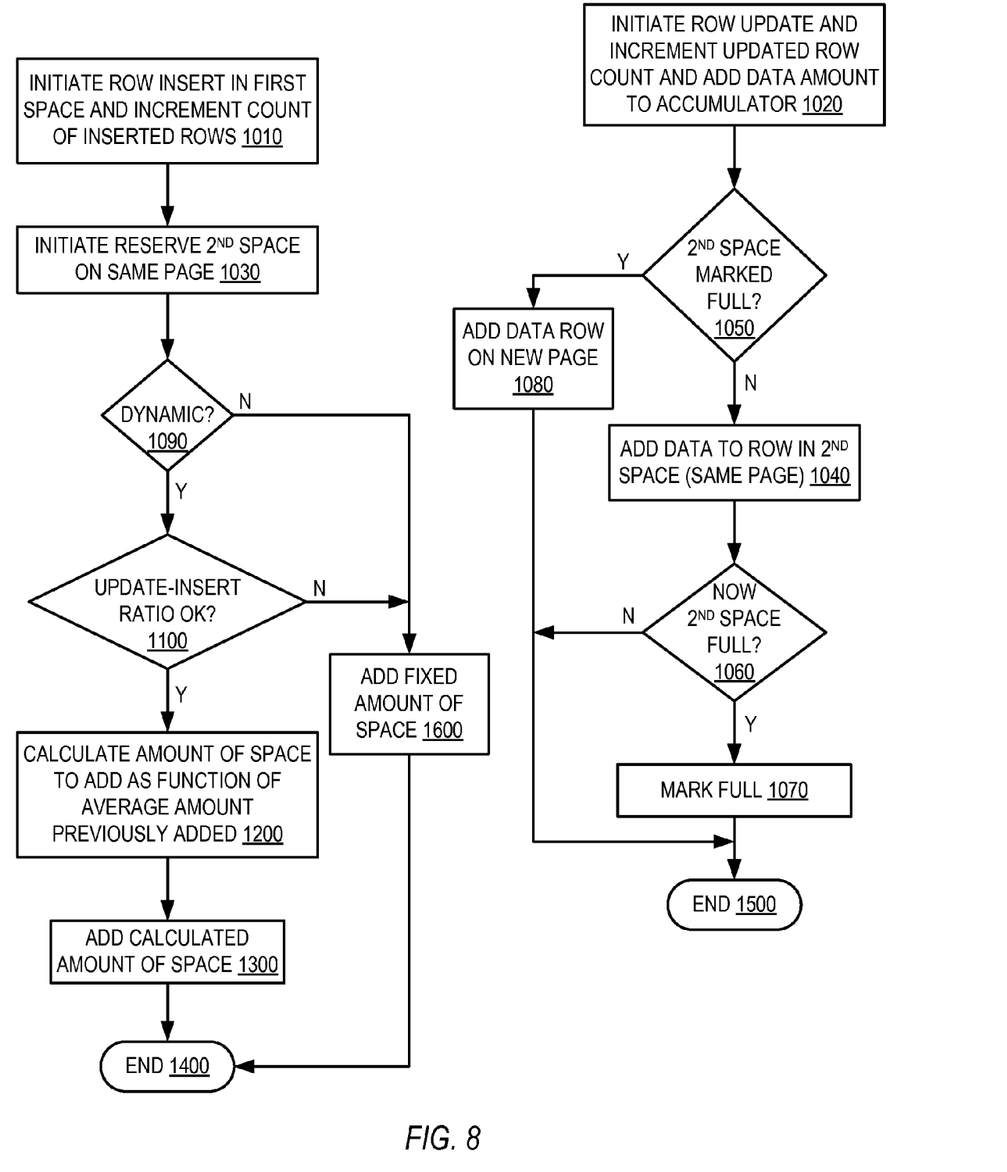
FIG. 8 is a flow chart illustrating autonomic calculation of space to reserve for UPDATES when a row is inserted, according to embodiments of the present invention.

Regarding FIG. 8, a flow chart is shown illustrating autonomic calculation of space to reserve for UPDATES when a row is inserted, according to embodiments of the present invention. In a first aspect of operation of database manager 740 of FIG. 7, as shown at action 1010, an INSERT operation initiates insertion of a database row in a first space reserved on a page of memory for inserting rows and a count of the number of inserted rows is incremented. In response to inserting the row, action 1030 initiates the reservation of a second space on the same page for future updating of the inserted row. The database manager checks at action 1090 to see whether the table schema indicates that such updating space is to be reserved on a dynamic basis, i.e., based on real-time statistics. If no, database manager may add a fixed amount of space for future updating, as indicated at action

1600, according to whatever predetermined amount is specified by the table schema. If yes, the database manager tests at action 1100 to see if the update—insert ratio indicates that a sufficient number of update operations have occurred relative to insert operations. At action 1100 the database manager may also test to see whether adequate real-time statistics have been gathered to proceed with dynamic space reservation for future updates on the inserted row, which may be indicated by other measures instead of or in addition to the update—insert ratio. If the test indicates not to proceed with dynamic space reservation, database manager branches to previously described action 1600. If the test indicates that dynamic space reservation may proceed, then the database manager calculates, at action 1200, the amount of additional row updating space to reserve for updating the new row and then, at action 1300, adds the calculated amount of space for the new row to the overall row updating space. The calculation at action 1200 is responsive to the average amount of data that has been added to already existing rows in the table by previous UPDATE operations. After adding the calculated amount of space, the row insert operation ends at 1400.

In another aspect of operation of database manager 740 of FIG. 7, as shown at action 1020, an UPDATE operation initiates changing a database row on the page of memory, a count of the number of updated rows is incremented, and an accumulator is updated to indicate the amount of data added to the row. Database manager checks at 1050 to see if the page is marked full with regard to space reserved for row updates. If yes, additional data for the updated row is added on a new page, as shown at action 1080. If no, the additional data is added in the reserved space for row updates on the same page, as shown at action 1040. If adding this data filled up the space reserved for updating rows, as indicated by a test at action 1060, then the database manager marks the page full with respect to the row updating space and then ends row updating operation at 1500. If adding this data did not fill up the space reserved for updating rows, then the database manager proceeds to end row the updating operation at 1500 without marking the page full with respect to the row updating space. The database manager may perform additional actions for inserting and updating rows that are not shown in FIG. 8 or explicitly described herein.

Hereinabove it has been described to reserve additional space for updating a row when the row is inserted based on the amount of space that has historically been added when updating rows previously. However, it should be appreciated that database manager 740 may actually reduce reserved space 52 for future updates upon inserting a new row, according to embodiments of the present invention. This may occur if the average amount of space added when updating rows is smaller than in a previous instance when a row was inserted, e.g., because smaller amounts have been added than in previous row updates. Still further, it should be appreciated that a row update may decrease the size of a row, which also tends to reduce the average amount of space used per row by updates. For example, referring again to FIG. 7, if the average amount of space per row that is added by updates is one kbyte, then if the conditions for dynamic reservation of update space are satisfied, when a new row is inserted database manager 740 adjusts the amount of space reserved in free space 52 so that the total amount of space 52=(one kbyte)×(total number of rows), e.g., rows 40, 42, etc. on the page 20, including the newly inserted row, such as row 48, for example.

In another aspect, according to embodiments of the present invention, database manager 740 may add to memory allocated for free space 52 using memory initially reserved for free space 50. Accordingly, if database manager 740 reduces memory for free space 52, i.e., because of decreased average amount of space used per row update, then database manager 740 may add the memory back to free space 50 that is removed from free space 52.

Regarding FIG. 1, a pictorial representation of a network data processing system 100 is shown in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support one or more PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ series system, running the IBM® AIX® operating system or LINUX® operating system. (IBM, eServer and AIXZ are trademarks of International Business Machines Corporation, registered in many jurisdictions worldwide. Linux is a registered trademark of Linus Torvalds in the United States, other countries, or both.)

With reference now to FIG. 3, a block diagram illustrating a data processing system is depicted in which in an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support a plurality of PCI expansion slots or add-in connectors.

An operating system runs on processor 302 and is used to coordinate and provide control of various components within data processing system 300 in FIG. 3. The operating system may be any available operating system (commercial or open source). An object oriented programming system such as Java may run in conjunction with the operating system and provide calls to the operating system from Java programs or applications executing on data processing system 300. (Java and all Java-based trademarks and logos are trademarks or registered trademarks of Oracle and/or its affiliates.) Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance.

Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and program products according to embodiments of the invention. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

The flowchart and block diagrams in the Figures illustrate the architecture, functionality, and operation of possible implementations of systems, methods and program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note that, although the invention is shown to be used in conjunction with a conventional computer system (i.e., clients 108, 110, 112 and server 104), the invention can easily be used by any handheld device (e.g., cellular telephone, PDA etc.).

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

As previously indicated herein above, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for allocating space in a database, the method comprising:
   inserting, by a computer processor, a row in a database table on a page having a first space reserved for inserting rows of the database table;
   reserving, by a computer processor, a second space for adding data to the inserted row, wherein reserving the second space includes reserving the second space on the page responsive to inserting the row, so that the amount of space reserved for adding data to inserted rows grows as more rows are inserted; and
   gathering real time statistics for reserving the second space on a dynamic basis, including gathering statistics indicating a first count of how many of an UPDATE operation changed data of rows of the database table and a second count of how many of an INSERT operation inserted new rows in the database table and wherein reserving the second space for adding data to the inserted row includes reserving the second space responsive to a ratio of the first and second counts.

2. The method of claim 1, wherein reserving the second space for adding data to the inserted row includes reserving the second space for the inserted row responsive to real time statistics gathered between operations that reorganize layout of the rows of the database table.

3. The method of claim 1, comprising:
   marking the page full for the second space independently of whether the first space is full for inserting new rows, wherein responsive to detecting that the second space is full, the method includes adding data to rows on the page by adding the data to one or more new pages, even though rows may still be inserted on the page using any remaining room in the first space on the page.

4. The method of claim 1, wherein reserving the second space for adding data to the inserted row includes reserving the second space in the first space.

5. A computer program product for allocating free space in a database program, the computer program product including a computer readable storage medium having instructions stored thereon for execution by a computer system, wherein the instructions, when executed by the computer system, cause the computer system to implement a method comprising:
   inserting a row in a database table on a page having a first space reserved for inserting rows of the database table;
   reserving a second space for adding data to the inserted row, wherein reserving the second space includes reserving the second space on the page responsive to inserting the row, so that the amount of space reserved for adding data to inserted rows grows as more rows are inserted; and
   gathering real time statistics for reserving the second space on a dynamic basis, including gathering statistics indicating a first count of how many of an UPDATE operation changed data of rows of the database table and a second count of how many of an INSERT operation inserted new rows in the database table and wherein reserving the second space for adding data to the inserted row includes reserving the second space responsive to a ratio of the first and second counts.

6. The computer program product of claim 5, wherein reserving the second space for adding data to the inserted row includes reserving the second space for the inserted row responsive to real time statistics gathered between operations that reorganize layout of the rows of the database table.

7. The computer program products of claim 5, wherein the instructions, when executed by the computer system, cause the computer system to implement a method further comprising:
  marking the page full for the second space independently of whether the first space is full for inserting new rows, wherein responsive to detecting that the second space is full, the method includes adding data to rows on the page by adding the data to one or more new pages, even though rows may still be inserted on the page using any remaining room in the first space on the page.

8. The computer program product of claim 5, wherein reserving the second space for adding data to the inserted row includes reserving the second space in the first space.

9. A system for allocating free space in a database program, the system comprising:
  a processor; and
  a computer readable storage medium connected to the processor, wherein the computer readable storage medium has stored thereon a program for controlling the processor, and wherein the processor is operative with the program to execute the program for:
    inserting a row in a database table on a page having a first space reserved for inserting rows of the database table;
    reserving a second space for adding data to the inserted row, wherein reserving the second space includes reserving the second space on the page responsive to inserting the row, so that the amount of space reserved for adding data to inserted rows grows as more rows are inserted; and
    gathering real time statistics for reserving the second space on a dynamic basis, including gathering statistics indicating a first count of how many of an UPDATE operation changed data of rows of the database table and a second count of how many of an INSERT operation inserted new rows in the database table and wherein reserving the second space for adding data to the inserted row includes reserving the second space responsive to a ratio of the first and second counts.

10. The system of claim 9, wherein reserving the second space for adding data to the inserted row includes reserving the second space for the inserted row responsive to real time statistics gathered between operations that reorganize layout of the rows of the database table.

11. The system of claim 9, wherein the processor is further operative with the program to execute the program for:
  marking the page full for the second space independently of whether the first space is full for inserting new rows, wherein responsive to detecting that the second space is full, the method includes adding data to rows on the page by adding the data to one or more new pages, even though rows may still be inserted on the page using any remaining room in the first space on the page.

12. The system of claim 9, wherein reserving the second space for adding data to the inserted row includes reserving the second space in the first space.

* * * * *